United States Patent [19]

Crombie

[11] Patent Number: 4,753,707
[45] Date of Patent: Jun. 28, 1988

[54] TWIN ROTARY DRUM TIRE MANUFACTURING UNIT

[75] Inventor: William Crombie, Rome, Italy

[73] Assignee: The Firestone Tire & Rubber Company, Akron, Ohio

[21] Appl. No.: 35,679

[22] Filed: Apr. 7, 1987

[30] Foreign Application Priority Data

Apr. 8, 1986 [IT] Italy .................... 67280 A/86

[51] Int. Cl.⁴ .............. B29D 30/26; B29D 30/08; B29D 30/24
[52] U.S. Cl. ............................ 156/396; 408/35
[58] Field of Search ............ 156/396, 414, 416, 117, 156/406.2; 408/35; 29/33 J, 53

[56] References Cited

U.S. PATENT DOCUMENTS

| | | | |
|---|---|---|---|
| 2,028,078 | 1/1936 | State et al. | 154/10 |
| 3,775,220 | 11/1973 | Rattray | 156/396 |
| 3,975,109 | 8/1976 | Frazierr | 408/35 |
| 4,134,783 | 1/1979 | Appleby et al. | 156/396 |
| 4,180,894 | 1/1980 | Link | 29/36 |
| 4,197,155 | 4/1980 | Hursell, Sr. | 156/414 |
| 4,268,330 | 5/1981 | Komatsu et al. | 156/157 |

FOREIGN PATENT DOCUMENTS 2158400  11/1985  United Kingdom ............... 156/396

*Primary Examiner*—Michael Ball
*Assistant Examiner*—Geoffrey L. Knable
*Attorney, Agent, or Firm*—Ernst H. Ruf

[57] ABSTRACT

A tire manufacturing unit having two tire building drums mounted on respective coaxial and independent half shafts butt connected in a rotary manner so as to define a single continuous shaft supported in a rotary manner on a platform mounted for rotation in successive 180° steps about a horizontal axis; each half shaft having a respective independent driving device, and one of the drums moving, during each rotation step of the platform, between a first and second work position, through a cavity formed in the platform supporting base.

5 Claims, 4 Drawing Sheets

TWIN ROTARY DRUM TIRE MANUFACTURING UNIT

TECHNICAL FIELD

The present invention relates to a twin rotary drum tire building unit used in the manufacture of pneumatic tires.

BACKGROUND OF THE ART

It is an object of the present invention to provide a tire building unit enabling two different consecutive operations to be performed simultaneously on two different tires carcasses on two different tire building drums.

A further object of the present invention is to provide a tire building unit of the aforementioned type enabling the said two tire building operations to be performed in two given separate positions by switching the said two drums between the said two positions.

Another object of the present invention is to provide a tire building unit of the aforementioned type designed in such a manner as to enable displacement of the said two drums between the said two positions without affecting the positions occupied, about the tire building unit itself, by other members cooperating with the tire building unit in the formation of the said tires.

A final object of the present invention is to provide a tire building unit of the aforementioned type having as compact a structure as possible, and, at the same time, enabling independent operation of each of said two drums.

DISCLOSURE OF THE INVENTION

According to the present invention, there is provided a twin rotary drum tire manufacturing unit, characterized by the fact that it comprises two coaxial half shafts; two tire building drums, each mounted on a respective half shaft; rotary connecting means for butt connecting the said two half shafts in such a manner as to define a single continuous shaft extending along a first axis; a platform supporting the said continuous shaft and the said connecting means; an upright supporting the said platform, the said platform being mounted on the said upright so as to turn about a second axis horizontally perpendicular to the said first axis; first and second driving means for turning the said two half shafts independently from one another about the said first axis; and third driving means for turning the said platform in successive 180° steps about the said second axis.

The above unit preferably includes a base supporting the said upright and the distance of which, from the said second axis, is less than the length of each said half shaft; the said half shafts being arranged symmetrically in relation to the said second axis, and a cavity being formed in the said base for enabling rotation of the said shaft, and the two co-axial tire building drums, about the said second axis.

The present invention will now be described by way of example with reference to the accompanying drawings.

BEST MODE FOR CARRYING OUT THE INVENTION

Figure 1:
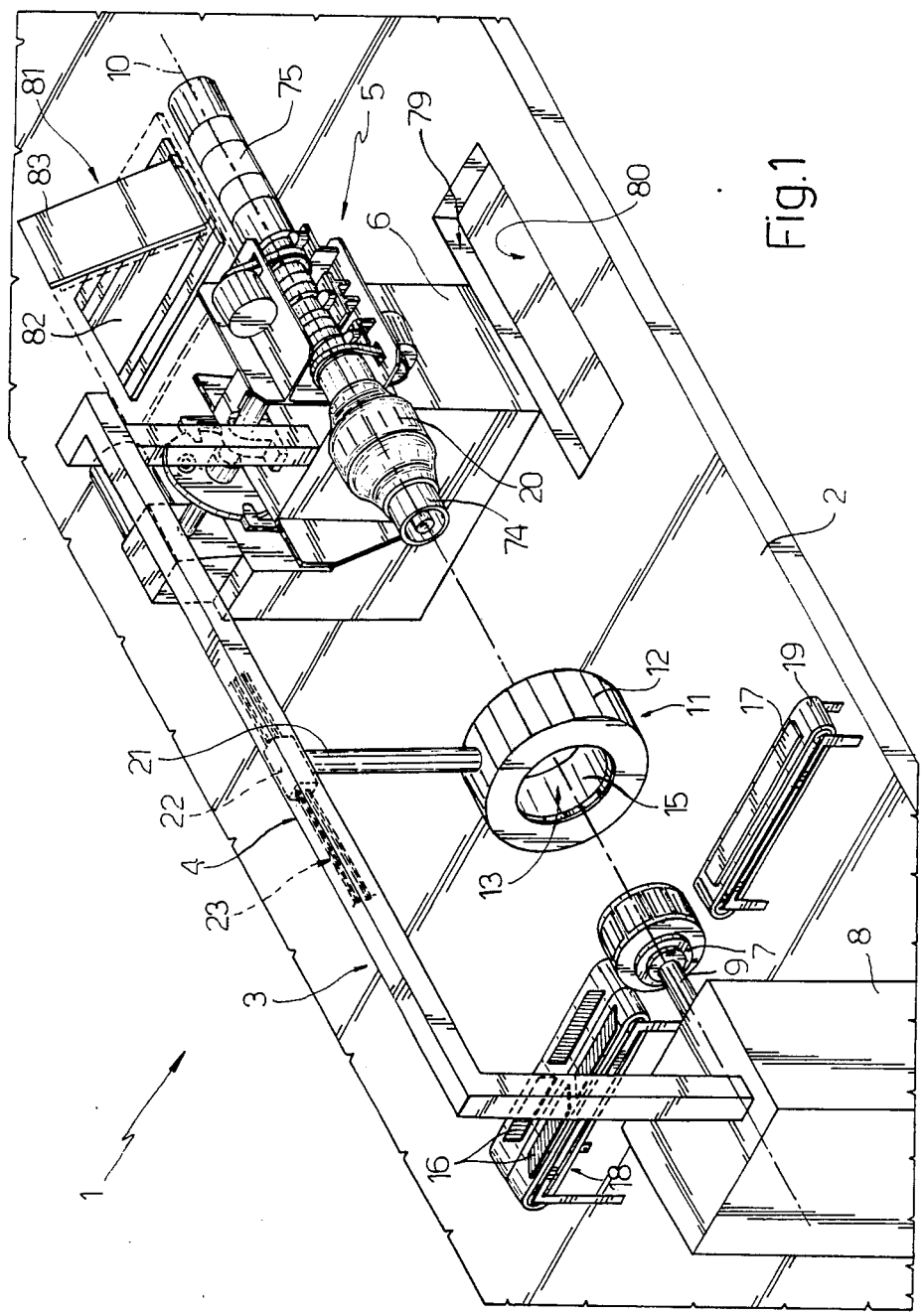
FIG. 1 is a schematic perspective view, with parts removed for clarity, of a tire assembly machine including a twin drum unit according to the teachings of the present invention.

Numeral 1 in FIG. 1 indicates a tire assembly machine comprising a base 2 and a superstructure or portal 3 extending upwardly from base 2 and having a substantially horizontal upper crosspiece 4. At one end of portal 3, there is provided a twin drum tire building unit 5 including an upright 6 arranged in a fixed position on base 2 and facing collapsible drum 7. Drum 7 is mounted for rotation on a support 8 at the other end of portal 3, and is turned by a shaft 9 designed to turn about its own axis 10 parallel with the longitudinal axis of crosspiece 4.

Machine 1 also includes a grab ring 11 mounted in such a manner as to slide along crosspiece 4 between unit 5 and drum 7 and comprises a torus 12 having a central circular passage 13 coaxial with axis 10 and is provided with a number of known radial actuator units (not shown) expansible inwardly for grabbing an annular package 15 usually consisting of a number of reinforced inner tread plies 16 and a tread 17 fed onto drum 7 by respective conveyors 18 and 19. Grab ring 11 is designed to transfer and hold annular package 15 around the periphery of unit 5 during the formation, on unit 5, of an inner tire carcass 20, and to unload the finished green tire (not shown) off unit 5.

Grab ring 11 includes a vertical tie bar 21 extending upwards from torus 12 and connected at the top to a slide 22 designed to slide, by virtue of actuator means 23, along crosspiece 4 between unit 5 and drum 7.

Figure 2:
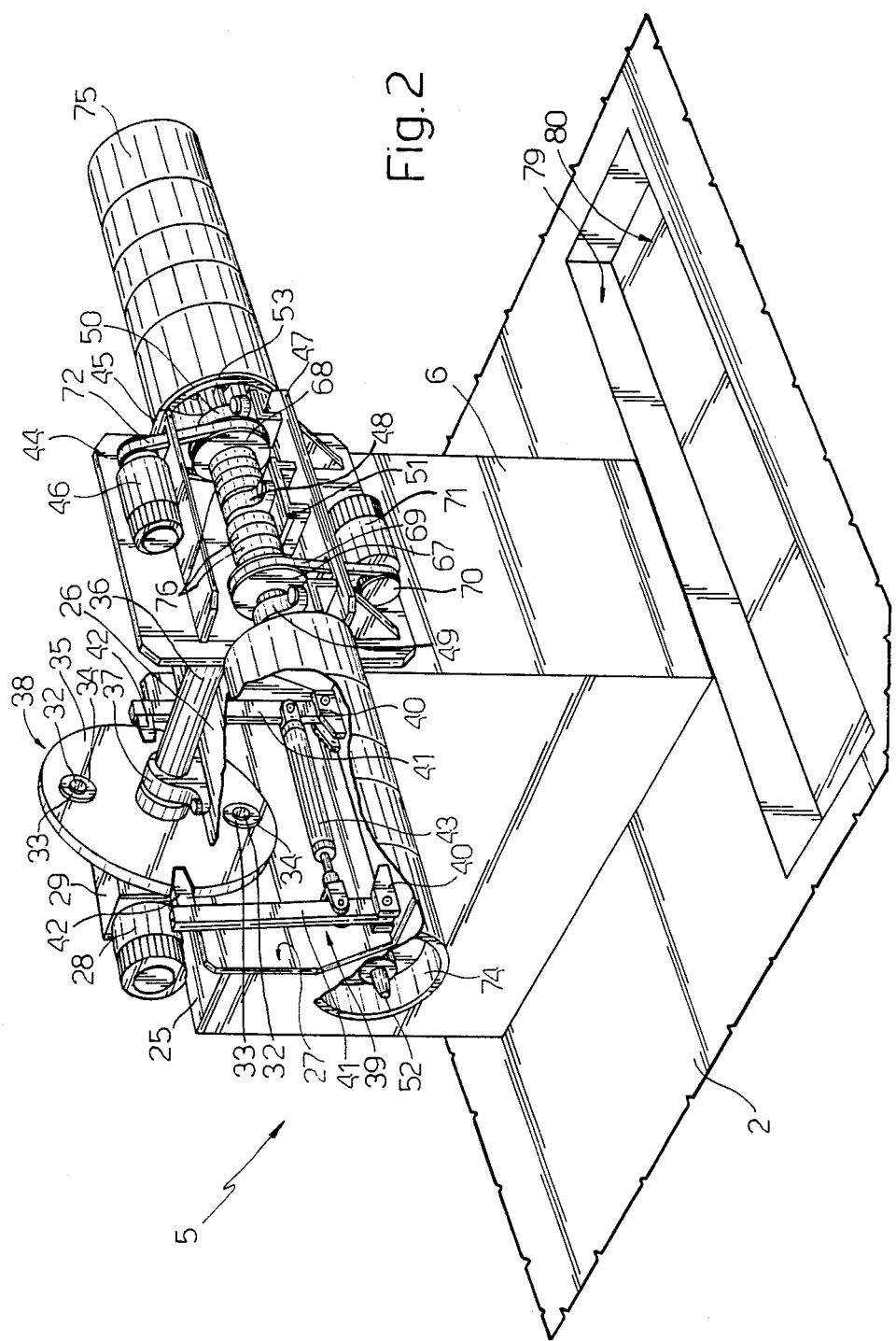
FIG. 2 is a partially-sectioned enlarged view in perspective, with parts removed for clarity, of the twin drum unit shown in FIG. 1.
Figure 3:
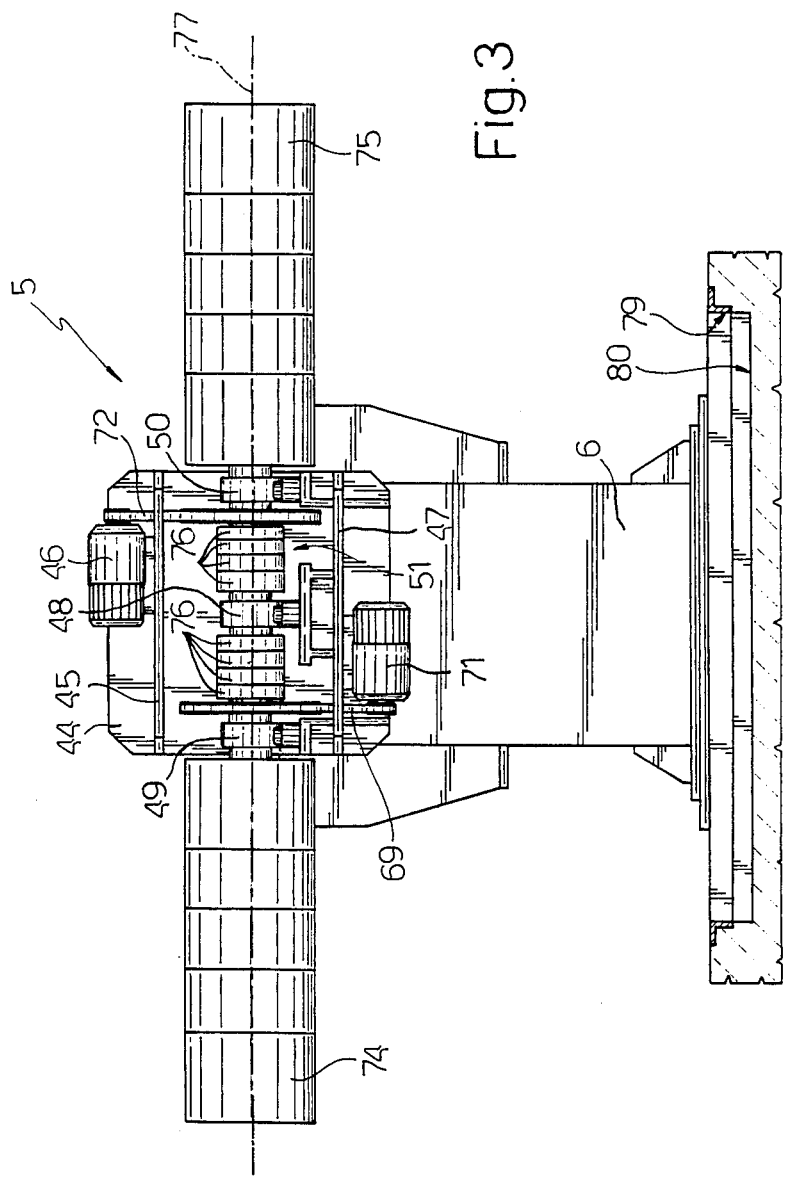
FIG. 3 is a front view, with parts removed for clarity, of the FIG. 2 unit.
Figure 4:
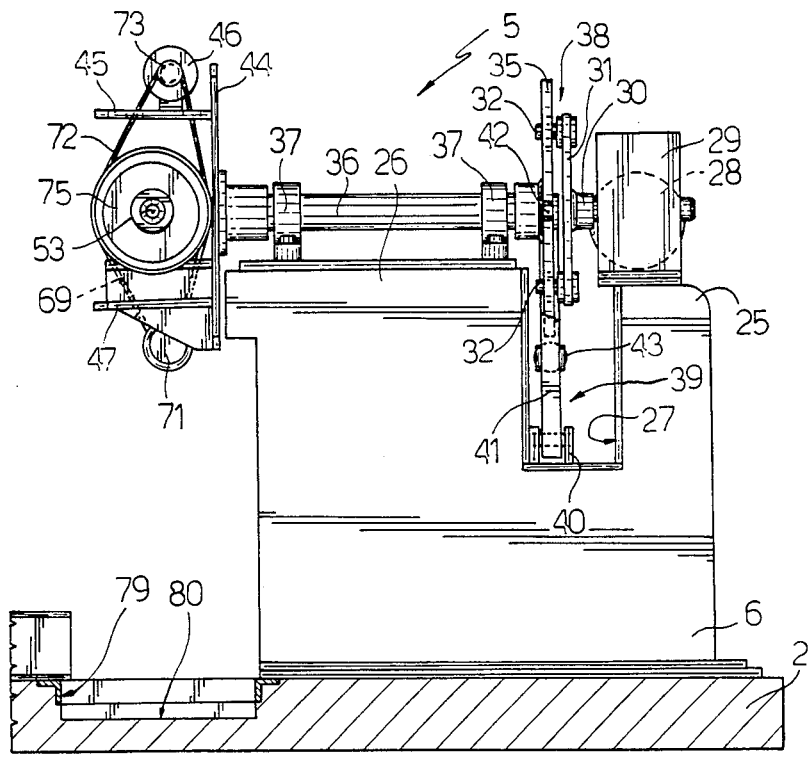
FIG. 4 is a side view of the unit shown in FIGS. 2 and 3.

As shown, particularly in FIGS. 2 and 3, upright 6 of tire building unit 5 includes an upper rear portion 25 and an upper front portion 26 separated by a vertical cutout 27 extending perpendicularly in relation to axis 10. On rear portion 25, there is provided a motor 28 having a reduction gear 29, the output shaft 30 of which extends horizontally and perpendicularly in relation to axis 10. The free end of shaft 30 is connected to the center line of a rod 31, from each end of which there extends a transverse pin 32 parallel with shaft 30. Each pin 32 engages, via the interposition of an elastomeric bumper 33, a respective through hole 34 formed on the periphery of a disc 35 perpendicular to shaft 30 and partially extending inside cutout 27.

Holes 34 are arranged diametrically opposite on disc 35 which is fitted onto the end of a shaft 36 coaxial with shaft 30 and supported by the upper front portion 26 of upright 6 by means of two main bearings 37.

Rod 31, pins 32 and disc 35 constitute a drive 38 between shafts 30 and 36. Drive 38 is provided with a lock brake 39 housed inside cutout 27 and comprising two anchoring brackets 40 mounted at the bottom of cutout 27 and each supporting in hinged manner a respective rod 41 extending upwards and fitted on its top end with a respective braking grip 42. Braking grips 42 are designed to engage diametrically-opposite peripheral portions of disc 35, and are thrust against each other and contacting disc 35 by a linear actuator 43 located between rods 41.

On the end of shaft 36 opposite the end facing shaft 30, there is fitted a platform 44 lying in a vertical plane and projecting forwards on the front end of front portion 26 of upright 6.

On a front surface of platform 44, there are provided two superimposed horizontal brackets, of which the upper one 45 supports a motor 46, and the lower one 47 supports, via the interposition of three supporting brackets, three coaxial main bearings, 48, 49 and 50, of which the first is located halfway between the other two.

Main bearings 48, 49 and 50 support, in rotary manner, a shaft 51 divided into two half shafts, 52 and 53, extending in diametrically-opposite directions in relation to shaft 36. Half shafts 52 and 53 are supported, in rotary manner, by respective main bearings 49 and 50, and are butt connected, in rotary manner, by a "plug and socket" type coupling 54 inside main bearing 48.

Figure 5:
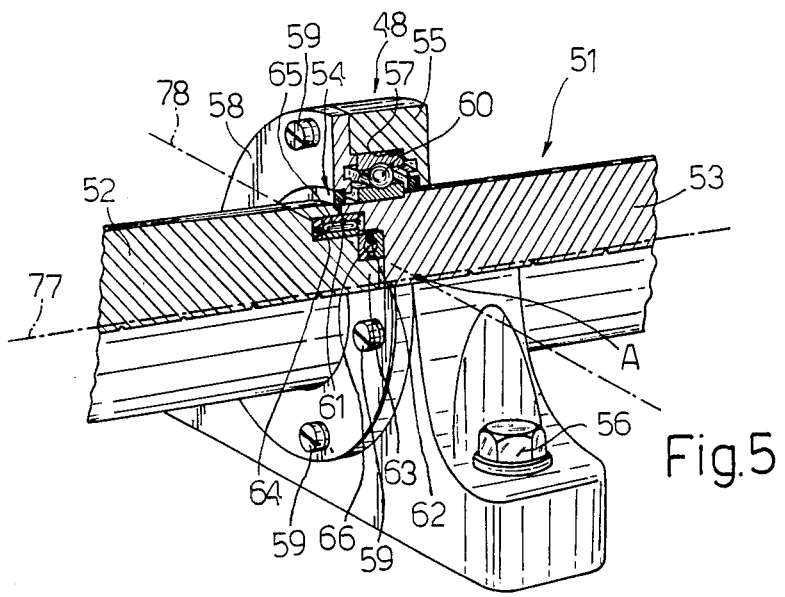
FIG. 5 is a partially-sectioned enlarged view in perspective of a detail in FIG. 2.

As shown in FIG. 5, main bearing 48 comprises an outer annular body 55 connected to bracket 47 by means of bolts 56 and having an inner annular cavity 57 closed laterally by a disc 58 connected integral with an axial end of annular body 55 by means of a series of bolts 59. Inside cavity 57 is locked the outer ring of a radial bearing 60, the inner ring of which is engaged by an end portion of half shaft 53 facing half shaft 52.

On the end of half shaft 53, there is formed a first cylindrical axial slot 61, at the bottom of which there is formed a smaller diameter second cylindrical axial slot 62. Similarly, from the end of half shaft 52 facing half shaft 53, there extends a cylindrical extension 63 extending inside slot 62 and surrounded by an axial annular groove 64 facing a peripheral portion of slot 61.

Groove 64 and slot 61 are engaged by the opposite lateral ends of the same radial roller bearing 65, whereas slot 62 is engaged by the outer periphery of a thrust bearing 66 the inner periphery of which is engaged by extension 63.

Between main bearing 48 and main bearings 49 and 50, half shafts 52 and 53 are fitted with respective pulleys 67 and 68, of which pulley 67 is engaged by a belt 69 wound about the output pulley 70 of an electric motor 71 mounted on platform 44 beneath bracket 46, whereas pulley 68 is engaged by a belt 72 wound about the output pulley 73 of motor 46.

Half shafts 52 and 53 are fitted respectively with any desired prior art unistage tire building drums 74 and 75, each of which is activated pneumatically, in a manner well known in the art, by means of respective half shaft 52 or 53, and a respective set of rotary pneumatic fittings consisting of hollow rings 76 mounted in rotary manner on half shafts 52 and 53 between pulleys 67 and 68 and main bearing 48.

As shown in FIG. 3, shaft 51 presents an axis 77 perpendicular to axis 78 of shaft 36 and intersecting axis 78 at point A (FIG. 5) constituting the center of main bearing 48. Point A also constitutes the intersection of axis 77 and axis 10, axis 77 moving into position coaxial with axis 10 when platform 44 moves into a given operating position as shown in FIGS. 1, 2 and 3.

The distance between point A and the base of upright 6 is less than that between point A and the end of each of half shafts 52 and 53, which are arranged symmetrically in relation to point A. Consequently, for enabling platform 44 to turn about axis 78, there is formed in base 2, just in front of upright 6, a cavity 79 the bottom surface 80 of which is located a greater distance from point A than is the end of either of half shafts 52 and 53.

Motor 28 is controlled in such a manner as to cause disc 35 and, consequently, shaft 36 to turn 180° clockwise, as seen in FIGS. 1 and 2, starting from a position wherein axis 77 is horizontally coaxial with axis 10. Consequently, for each step of motor 28, the respective positions of drums 74 and 75 are inverted or reversed. In more detail, drum 74 or 75 is initially located, as seen in FIGS. 1 and 2, to the right of upright 6 of unit 5 and laterally faces any desired prior art unit 81 for feeding an impermeable inner layer 82 and an outer body ply 83 required for tire carcass 20. Drum 74 or 75 moves over to the left of upright 6, by rotating through cavity 79, into a position facing and coaxial with drum 7.

A first mode of operation of machine 1 will now be described starting from the position shown in FIG. 1, wherein drum 74 is located to the left of upright 6 and is approaching the end of the formation of tire carcass 20.

At this moment in time, grab ring 11 has grabbed a freshly finished annular package 15, previously formed on drum 7 by conveyors 18 and 19 feeding tread plies 16 and tread 17, and is moving towards drum 74 to transfer the noted annular package 15 onto drum 74 before completion of tire carcass 20. Consequently, formation of tire carcass 20 is completed inside grab ring 11 and annular package 15, which is connected to carcass 20 to produce a substantially finished green tire.

Grab ring 11 then withdraws from drum 74 so as to enable the said green tire to be subjected to a stitching operation performed by means of any desired prior art stitching device (not shown), for ensuring perfect adhesion of carcass 20 to outer annular package 15.

Upon completion of the said stitching operation, grab ring 11 moves back onto drum 74 so as to remove the said green tire and return to its central position wherein the said tire is unloaded.

During the performance of all these operations by grab ring 11 and drum 74, a new tire carcass 20 is formed on drum 75 by feeding onto the said drum 75 an inner layer 82, a body ply 83 and a pair of spaced beads (not shown), while, at the same time, another annular package 15 is being formed on drum 7.

At this point in time, brake 39, which was previously locked, is released by expanding actuator 43, and motor 28 is activated so as to turn platform 44 180° and so invert the positions of drums 75 and 74. Brake 39 is then again locked, and the cycle is repeated for producing another finished green tire.

Before rotation of platform 44, the noted beads (not shown) are locked in position on drum 75 in a known manner and, during rotation of platform 44, drum 75 is operated to start shaping tire carcass 20.

A few comments should be made in connection with the aforementioned operation and tire building unit 5 by which it is made possible.

Firstly, turning platform 44 about a horizontal axis 78 enables feeding unit 81 to be positioned close to whichever one of drums 74 and 75 is located to the right of upright 6 and, above all, enables feeding unit 81 to be set in a fixed position which is in no way affected by operation of tire building unit 5.

Secondly, turning platform 44 about horizontal axis 78, so as to move the loaded right-hand drum 74 or 75 downwards and the then unloaded left-hand drum upwards, enables the difference in weight between the said two drums to be exploited for reducing the power of motor 28.

Furthermore, in addition to rendering the entire machine 1 extremely compact, rotary butt coupling 54 between half shafts 52 and 53 also ensures that the said shafts 52 and 53 are maintained coaxial at all times. Consequently, only one setting, i.e. that of motor 28, is required for ensuring that, subsequent to each 180° step of motor 28, drums 74 and 75 are positioned coaxial with axis 10 upon which correct operation of machine 1 depends.

Finally, coupling 54 enables drums 74 and 75 to be controlled totally independently.

According to another mode of operation, a pair of spaced beads (not shown) is fed onto each drum 74, 75 only when the same reaches the left hand position on unit 5. Therefore, the shaping of carcass 20 starts in this left hand position when grab ring 11 transfers annular package 15 onto and around the left hand one of drums 74 and 75.

From the forgoing description and the operational discussion, when read in light of the several drawings, it is believed that those familiar with the art will readily recognize and appreciate the novel concept and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes or the like without departing from the spirit and scope of the invention with the latter being determined solely by reference to the claims appended hereto.

What is claimed is:

1. A twin rotary drum tire manufacturing unit, comprising two coaxial half shafts; two tire building drums, each mounted on a respective half shaft; rotary connecting means for butt connecting the said two half shafts in such a manner as to define a single continuous shaft extending along a first axis; a platform supporting the said continuous shaft and the said connecting means; an upright supporting the said platform, the said platform being mounted on the said upright so as to turn about a second axis horizontally perpendicular to the said first axis; first and second driving means for rotation of the said two half shafts independently from one another about the said first axis; and third driving means for turning the said platform in successive 180° steps about the said second axis.

2. A unit as claimed in claim 1, wherein said unit includes a base supporting the said upright and the distance of which, from the said second axis, is less than the length of each said half shaft; the said half shafts being arranged symmetrically in relation to the said second axis, and a cavity being formed in the said base for enabling rotation of the said shafts, and the two co-axial tire building drums, about the said second axis.

3. A unit as claimed in claim 2, wherein said third driving means includes a motor, a drive means between the output of the said motor and the said platform, and a brake device designed to lock said drive means at the end of each of said rotation steps.

4. A unit as claimed in claim 2, wherein said rotary connecting means are of the plug and socket type; the said socket and the said plug being formed on respective facing ends of the said two half shafts, and a radial bearing and an axial thrust bearing being inserted between the said socket and the said plug.

5. A unit as claimed in claim 4, wherein said tire building drums are unistage drums.

* * * * *